(12) United States Patent
Barker et al.

(10) Patent No.: US 9,611,842 B2
(45) Date of Patent: Apr. 4, 2017

(54) AIR COMPRESSOR

(75) Inventors: Philip Alfred Barker, Suffolk (GB); Nitzan Gonen, Suffolk (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 901 days.

(21) Appl. No.: 13/260,126

(22) PCT Filed: Mar. 4, 2010

(86) PCT No.: PCT/GB2010/000383
§ 371 (c)(1),
(2), (4) Date: Sep. 23, 2011

(87) PCT Pub. No.: WO2010/112800
PCT Pub. Date: Oct. 7, 2010

(65) Prior Publication Data
US 2012/0027631 A1    Feb. 2, 2012

(30) Foreign Application Priority Data
Mar. 30, 2009   (GB) .................................. 0905453.7

(51) Int. Cl.
*F04C 29/02*   (2006.01)
*F04B 39/16*   (2006.01)
*G02B 6/44*    (2006.01)

(52) U.S. Cl.
CPC ............ *F04B 39/16* (2013.01); *F04C 29/026* (2013.01); *G02B 6/4464* (2013.01); *Y10S 418/01* (2013.01); *Y10T 29/49826* (2015.01); *Y10T 29/53* (2015.01)

(58) Field of Classification Search
CPC ........................... F04C 29/026; Y10S 418/01
USPC .... 417/234, 313, 364, 366, 410.3; 418/55.6, 418/89, 91, 97, 100, DIG. 1
See application file for complete search history.

(56) References Cited

U.S. PATENT DOCUMENTS

| | | | |
|---|---|---|---|
| 2,513,912 A | | 4/1947 | Bousky |
| 3,258,198 A | * | 6/1966 | Harlin .............................. 418/93 |
| 3,312,387 A | | 4/1967 | Cassidy et al. |
| 3,386,648 A | * | 6/1968 | Van Rossem ................. 418/108 |
| 3,669,579 A | * | 6/1972 | Carter ............................. 418/83 |
| 3,832,831 A | | 9/1974 | Ritchie et al. |
| 4,071,306 A | * | 1/1978 | Calabretta ...................... 418/82 |
| 4,260,402 A | | 4/1981 | Shaffer et al. |
| 4,342,547 A | * | 8/1982 | Yamada et al. ................ 418/84 |
| 4,571,164 A | * | 2/1986 | Shibuya et al. ................ 418/76 |

FOREIGN PATENT DOCUMENTS

| | | |
|---|---|---|
| DE | 1 172 798 | 6/1964 |
| DE | 41 35 442 C1 | 4/1993 |
| EP | 0 108 590 A1 | 5/1984 |

(Continued)

*Primary Examiner* — Peter J Bertheaud
(74) *Attorney, Agent, or Firm* — Patterson Thuente Pedersen, P.A.

(57) ABSTRACT

A compressor including an oil separator connected to a supply of compressed air, the oil separator including a chamber having a wall defining a cavity within the chamber, and a vent within the wall, wherein the vent is in communication with the supply of compressed air at a first end, and in communication with the cavity via a second aperture, and extends substantially parallel to an externally-facing surface of the wall.

11 Claims, 4 Drawing Sheets

(56) References Cited

FOREIGN PATENT DOCUMENTS

| GB | 1 318 885 | 5/1973 |
|----|-----------|--------|
| JP | 57-35179 | 2/1982 |
| WO | WO 2006/103424 | 10/2006 |

* cited by examiner

AIR COMPRESSOR

RELATED APPLICATIONS

The present application is a National Phase entry of PCT Application No. PCT/GB2010/000383, filed Mar. 31, 2010, which claims priority from Great Britain Patent Application No. 0905453.7, filed Mar. 30, 2009, the disclosures of which are hereby incorporated by reference herein in their entireties.

TECHNICAL FIELD

This invention relates to apparatus, systems and methods related to air compressors, particularly but not exclusively to compressors used for the installation of optical fiber units and cable using the blown fiber method.

BACKGROUND

The blown fiber technique is well known as involving the installation of optical fiber transmission lines into optical fiber tubes or ducts using the viscous drag provided a high-speed flow of a fluid medium (in practice, this is pressurized air from an air compressor), from EP 108590 and subsequent publications. In essence, plastic tubes or conduits are initially installed along paths or to locations where an optical fiber connection may one day be desired or necessary. The expensive decision to deploy optical fiber units (comprising a bundle of single fibers) along those paths can thus be deferred until a decision is made to have the fiber installed through the conduits by "blowing" them through.

The apparatus required for such an installation includes a blowing head and an air compressor. During installation, one end of the fiber tube is fitted to the blowing head, so that the bore of the tube communicates with a bore within the blowing head. Fiber unit and air is fed through the bore of the blowing head, into the bore of the tube. Thus the blowing head has two main functions: to mechanically drive the fiber unit into the tube, using a pair of drive wheels, and to direct pressurized air from the compressor into the tube via an air hose.

Currently, installing blown fiber requires at least two operators, for various reasons, such as the large size and sheer weight of the compressor in particular. The compressor currently used by the applicants weighs 85 kilograms (kg), which is impossible for a single person to lift. It is unwieldy, difficult and dangerous for a single person to remove it from a van even if mounted on a wheeled frame. This compressor, or one similar to it, is used by blown fiber practitioners in the UK and throughout the world, for example 6A Petrol Engine Driven Blown Fibre Compressor, the Sirocco Petrol Compressor (PRYSMIAN SPA [trade] S.p.A. of Milan, Italy), and so on.

The supplied air needs to satisfy certain criteria required for successfully blowing fiber. These include: Pressure, Volume, Temperature, Dryness, Oil carryover, and Smooth, pulse-free delivery, among others.

The air needs to flow within the tube at a sufficient velocity to provide the fluid drag to carry the fiber unit within the fiber tube. A discussion of air pressure and flow levels required for installing blown fibre can be found in EP 108590 (supra). It is desirable that a compressor for blown fiber installation deliver a smooth, pulse-free supply of air. The air should be relatively dry so that moisture from condensation should not interfere with the installation process, yet not so dry so that static electricity is generated by the movement of the fiber unit though the tube. As air temperature is related to air dryness, it is desirable that the air produced by the compressor should be not more then 2° C. above ambient.

As noted above, the pressurized air of this compressor is directed into the fiber tube via a bore within the blowing head. The blowing head typically comprises two parts clamped together, and more than half of the pressurized air pumped into the narrow bore of the blowing head escapes through the seams. As a result, installers typically need to use a large, powerful compressor capable of supplying the large quantity of air need to make up that wasted at the blowing head and which never reaches the tube. A typical compressor is capable of supplying up to 200 liters per minute.

The current blown fiber installation process is labor-intensive as requiring two operators, and the waste necessitates the use of larger and more powerful equipment than is perhaps strictly necessary. Installation costs are therefore high. Such expenditure was previously considered acceptable e.g. because optical fiber was to service high-worth commercial customers. Optical fiber is however becoming increasingly mass-deployed throughout networks worldwide. In the UK for example, a planned transition to a Next Generation Network (the BT "21ST CENTURY NETWORK"), and the move to "Fibre to the Kerb" or to the Home, all point to the increasing deployment of large volumes of optical fiber—for which blowing is an installation method of choice—throughout the network at a variety of levels. With this comes pressure to reduce costs, especially in the provisioning of optical connections to extremely price-sensitive residential customers.

In response, the applicants have developed an improved blowing head which decreases the level of wasted air, so that much more from the compressor may be delivered into the fiber tube. This is described in WO 2006103424, the disclosure of which is hereby incorporated by reference herein in its entirety. As a result of this improvement, a less powerful compressor can be used with the blowing head including the inventive feature described in WO 2006103424.

As a result, use of a compressor which is portable being small and light enough for a single operator to lift and safely deliver to the installation site, set up and manage, would contribute directly to potentially halving the manpower time and cost involved in an installation. Such a lightweight compressor would nonetheless need to reliably produce air of the industrial quality described above needed for a successful blown fiber installation.

Currently, compressors for industrial application which are capable of producing air to the required standard in a reliable manner for a successful installation exceed 25 kg, being the limit to what may be reasonably carried by a single operator. There are therefore severe design constraints in the arrangement of the essential components of a compressor suitable for the cost-efficient and widespread installation of blown fiber.

SUMMARY OF THE INVENTION

In an embodiment, there is provided a compressor including an oil separator connected to a supply of compressed air, the oil separator comprising a chamber having a wall defining a cavity within the chamber, and a vent within the wall, wherein the vent is in communication with the supply of compressed air at a first end, and in communication with the cavity via a second aperture, and extends substantially parallel to an externally-facing surface of the wall.

To reduce its overall footprint and to reduce the weight by almost 3.5 times, the various components of the compressor are scaled down in size, replaced by smaller versions, rearranged and repositioned relative to each other. One significant change made was the replacement of the large motor engine with a smaller one which still produces air pressurized to 10 bar as is typically required, but which need not produce the same quantity of air, owing to the improvements made to the blowing head which is less leaky and wasteful of air.

In embodiments of compressors, the need to pare down all non-essentials to fit within the required size and weight parameters resulted in the oil separation unit being exposed directly to the air. This would, at least in the UK, typically be cooler than the operational temperature of the compressor, and certainly cooler than the compressed air exiting the compression chamber. The compressed air can carry a considerable amount of moisture, which can be dumped as water into the separation chamber upon being suddenly cooled on entry into the oil separator. The presence of an excessive amount of water within the chamber interferes with the operation of the oil filters.

To address this problem, the water vapor carried in the compressed air is removed prior to its entry into the separation chamber. This is carried out by passing the warm, moisture-laden air through vents which are configured to pass along the walls of the separation unit, so that at least a part of the moisture condenses before entry into the chamber.

In embodiments, the vents take the form of channels or grooves provided along the surface of the chamber body, so that when a housing is fitted over the chamber body, bores are formed along which the compressed air travel on their way into the chamber.

In an embodiment, the arrangement of the motor relative to the compressor unit has been designed to minimize its size and weight. As is well known, a small motor runs optimally (i.e. with highest efficiency) at a higher speed than a larger motor. The compressor blades mounted on the rotating rotor would therefore, if directly driven by the smaller motor, move at this higher speed. This high speed can be not optimal, and indeed can be counter-productive as the interlobe space between the moving blades effectively reduces to the extent that air is unable to enter the interlobe space during the intake stage as there is insufficient time for the interlobe space to become fully occupied by incoming air.

In an embodiment, the compressor is belt-driven (and thus is indirectly driven) by the motor. By changing the gearing ratio between the compressor and the motor, it is possible to use a smaller motor but still obtain good, if not optimal, compressor performance by its operating at an appropriate speed. Advantageously, use of a belt and pulleys also allow for the compressor and the motor to be positioned parallel to each other, which contributes directly to the reduction in the overall bulk and footprint of the compressor, and so to the improved ease of handling by a single operator.

In an embodiment, there is provided a system for installing an optical fiber into a tube using pressurized air supplied by a compressor.

In an embodiment, there is provided a method for an optical fiber into a tube by using pressurized air supplied by a compressor.

Embodiments of the compressor are usefully deployed in the context of the supply of air into tubes via a blowing head in an installation, but the invention can be as useful in other areas of industry and commerce or the like.

BRIEF DESCRIPTION OF THE DRAWINGS

Embodiments will now be described by way of example only with reference to the accompanying drawings in which.

DETAILED DESCRIPTION

Figure 1:
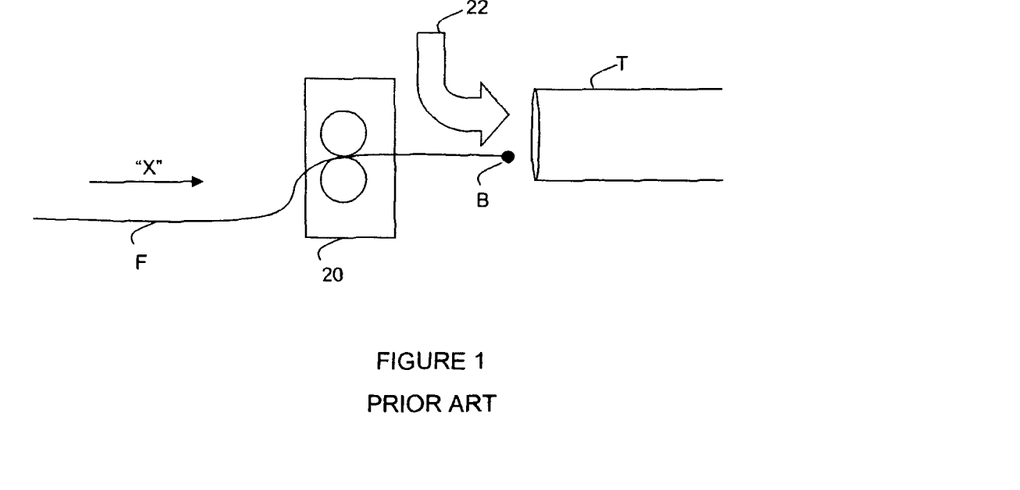
FIG. 1 is a schematic depiction of known apparatus used to install optical fiber using the blown fiber method.

FIG. 1 depicts the main components of a blown fiber installation as is known, where a fiber unit (F) is installed in the direction of arrow "X" into a blown fiber tube (T) via a blowing head (20) assisted by a supply of pressurized air (22).

Figure 2:
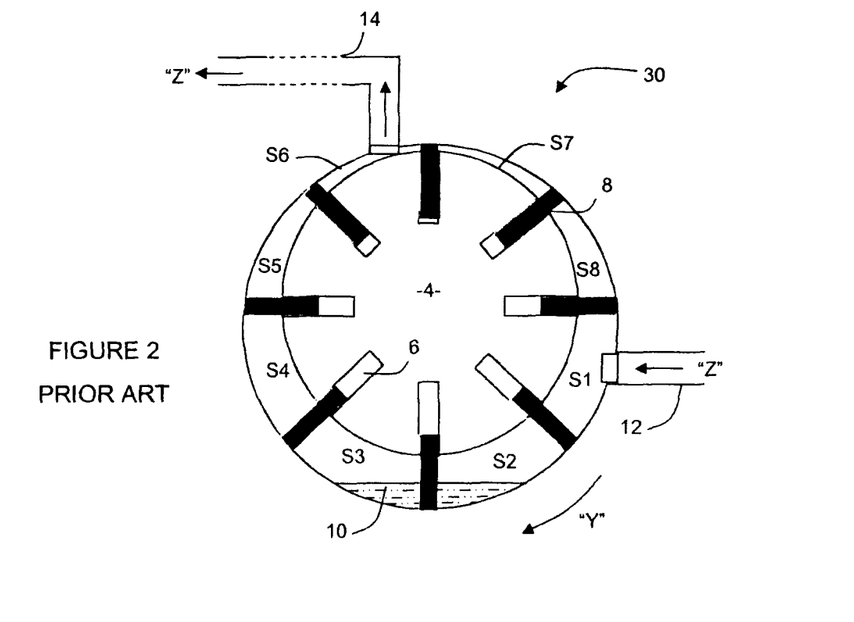
FIG. 2 is a schematic view of the main components of a known compressor.

FIG. 2 is a schematic view of a typical rotary vane compressor (30) which supplies the pressurized air (22) for the installation. It has a stator or rotor (4) which includes radial slots (6), into which are inserted vanes or blades (8). The housing contains oil so that during operation, all surfaces within the housing are coated with a film of oil (10). The rotor is mounted in an offset position within a housing (10) so that the outer ends or tips of the blades brush, touch or almost touch the wall of the housing (which is typically circular in its cross-section). Enclosed interlobe cells or spaces between blades and the housing wall are formed as a result, and are marked S1 to S8 in the figure. The enclosed spaces comprise different volumes owing to the offset or eccentric positioning of the rotor relative to the housing.

In use, the rotor rotates, here in the direction of arrow "Y". The blades slide in and out of their slots on the oil film in the slots, as a result of e.g. centrifugal forces. The outer ends of the blades thus continually stay in contact with the wall of the housing which with the oil film coating the blade tip and the housing wall, forms a sealed chamber which is an interlobe space.

During use, atmospheric air moves in the direction of arrow "Z" into, through and eventually out of the compressor. As the blades move along in the direction of arrow "Y", the air initially present, or which enters the compressor through air inlet (12) into enclosed space S1, decreases in volume as the rotor rotates (assuming the equivalent of the volumes of spaces S2 to S6 in turn as the rotor progresses in the arrowed direction). The air contained in the enclosed space is gradually compressed during this process, so that by the time a particular parcel of air reaches the air outlet (14), out into a duct which is dimensioned to maintain the air pressure until it is eventually discharged from the compressor. The compressed air is, at the point of its exit from the housing, warmer and wetter than before it entered the housing. The air also contains oil from its time in the housing, so that the compressed air can be processed to ensure that the air leaving the compressor and entering the blown fiber tubes is of the correct temperature/dryness and also is relatively oil-free.

To rid the air of oil, the air passes by internal air pressure through a path of a specific length and configuration within the body of the compressor, which typically brings the untreated air to and through various oil separators, filters, dryers and coolers (which can be an integral part of the compressor, or separate thereto) to process the air to obtain the desired characteristics. The treated air eventually leaves the compressor as pressurized air (22) to be fed into the fiber tube via the compressor as shown in FIG. 1.

A typical motor powering the compressor is the HONDA [trade] GX240QX overhead valve (OHV) petrol engine (not shown), which directly drives the rotor (40) within the compressor housing, i.e. without any change in gearing ratio.

Figure 3:
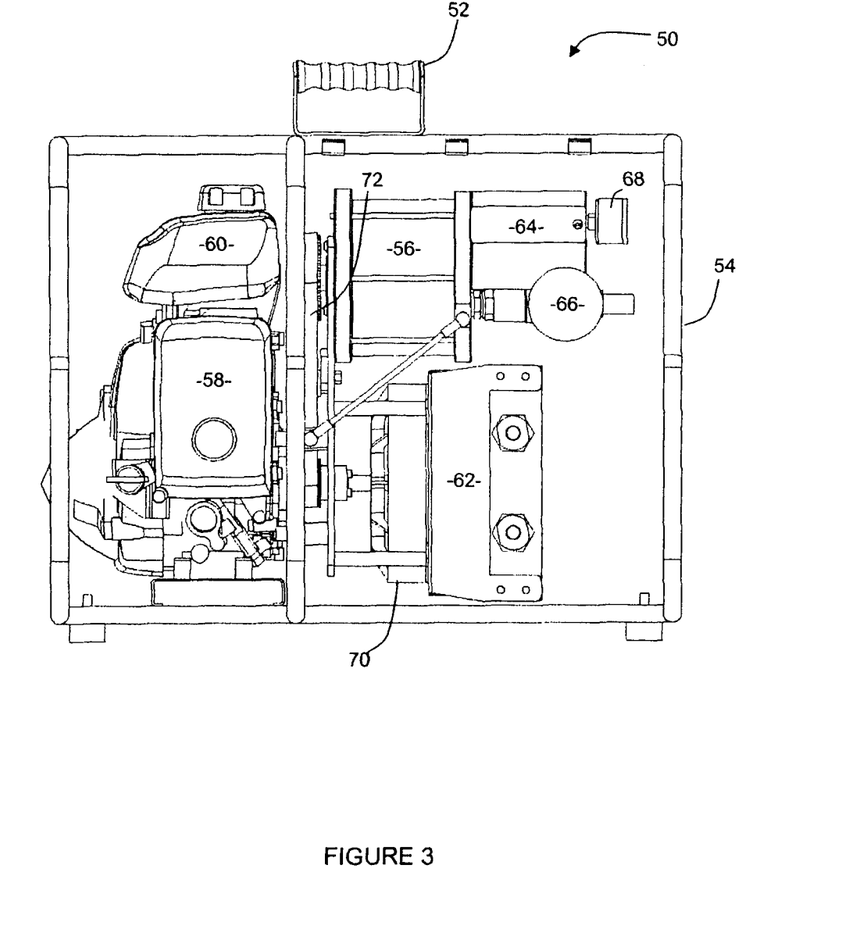
FIG. 3 is a side view of the components of a compressor according to an embodiment.

FIG. 3 is a side view of a compressor (50) according to an embodiment. Using the FACTAIR 6A compressor for purposes of comparison, it is considerably smaller (L 520 mm×W 300 mm×H 460 mm, as opposed to L 900 mm×W 500 mm×H 750 mm). Importantly, it is also lighter (23.5 kg as opposed to 85 kg) and so is capable of being lifted. The compressor of embodiments can generate air pressurized to 10 bar, although the volume produced is less than the 6A compressor (70 l/min as opposed to 200 l/min), it is sufficient in an installation using the improved blowing head where air loss is considerably reduced.

The compressor comprises a compressor housing (56) which is coupled to the motor engine (58) by a belt (72). This compressor includes a fuel tank (60) as, in an embodiment, it is powered by gasoline, although, in another embodiment it can be configured to run off electricity via mains power or a battery. Air entering the compressor housing is filtered by an air filter (66), and an oil separator (64) coupled to the compressor enables oil to be removed from the pressurized air. A fan (70) is positioned to cool the hot oil in the oil cooler (62) arriving from the compressor chamber. A pressure gauge (68) is also provided. This lightweight compressor (50) includes a frame (54) and a handle (52) which permits it to be lifted.

The compressor of embodiments is powered by a smaller engine, for considerations of size, weight and the reduced need for power. A suitable motor is the Honda GXH50, which operates within the range of about 4,200 to 7,700 rpm. Increasing the rotational speed of the compressor rotor will increase air volume production up to a point, beyond which further speed increases will be counter-productive. This is because of the effective reduction of the enclosed or interlobe space i.e. the exposure or running clearance available for air entry through the air inlet (12 in FIG. 2) into the interlobe space S1 (of FIG. 2) as the blade rotation speed increases. Not only is air unable to flow into space S1, but at very high speeds air within the space could backflow into the inlet tube following the generation of high pressures within the space. A very fast-running compressor could also compromise the oil film between blade end and housing wall, and reduce the sealing effect.

Figure 4A:
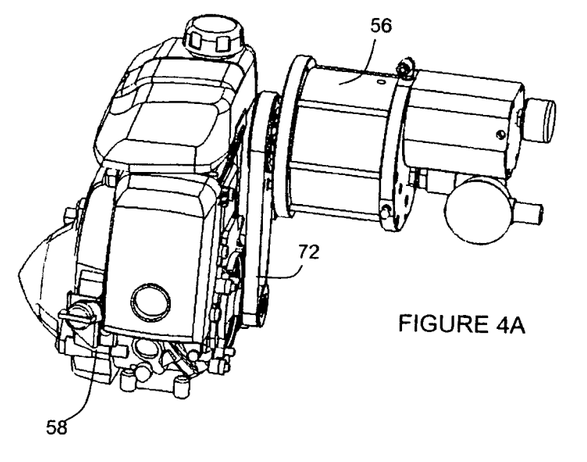
FIGS. 4A and 4B depict detailed views of specific components of a compressor according an embodiment.
Figure 4B:
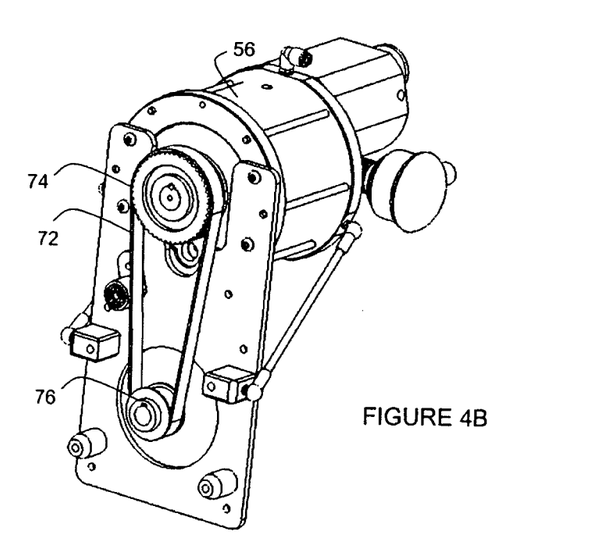

In an embodiment of the compressor, the smaller engine deployed optimally runs at a speed which exceeds the optimal running speed of the compressor rotor. To accommodate the desired lower running speed of the compressor, embodiments include a gearing mechanism, which is shown in detail in FIGS. 4A and 4B.

The motor (58) includes a pulley (76) which drive the compressor (56) via a compressor pulley (74) using a belt (72). The skilled person can appreciate that any other type of gearing mechanism or technique can be used to the same end. As can be seen in the two views shown in FIGS. 4A and 4B, the compressor pulley (74) is larger than the motor pulley (76), so that the high-speed motor drives the compressor rotor (not shown) within the housing at a reduced speed. In an embodiment, the compressor has a gearing ratio of 2:1 so that the engine output of 5,350 rpm runs the compressor at a speed of 2,675 rpm.

By gearing and positioning the compressor in parallel with the engine in this manner, the small footprint of the compressor can be obtained. A smaller, lighter motor which output matches the air pressure and volume requirements for a blown fiber installation can be used, which goes to contributing to the reduced weight and size of the device.

The skilled person can appreciate that this configuration can be used to similarly reduce the size and weight of any type of professional grade compressors which produce high-quality supplies of air for industrial purposes, including e.g. piston or rotary screw compressors, in addition to those using rotary vanes. Furthermore, the action of the compressor need not be restricted to rotational movement, but could be the movement of a piston within a cylinder in a piston compressor.

As a result of the particular configuration of the compressor to reduce both its weight and footprint, the oil separator (64) (shown in isolation from the rest of the compressor in FIG. 5) is relatively exposed. As discussed above and shown in FIG. 3, the oil separator is connected to the compressor (56) at one end. Compressed air flowing into the oil separator from the compressor is laden with oil. As it is compressed, it is also warm or hot, so that its moisture in the form of vapor is also high.

Figures 5, 6, 7:
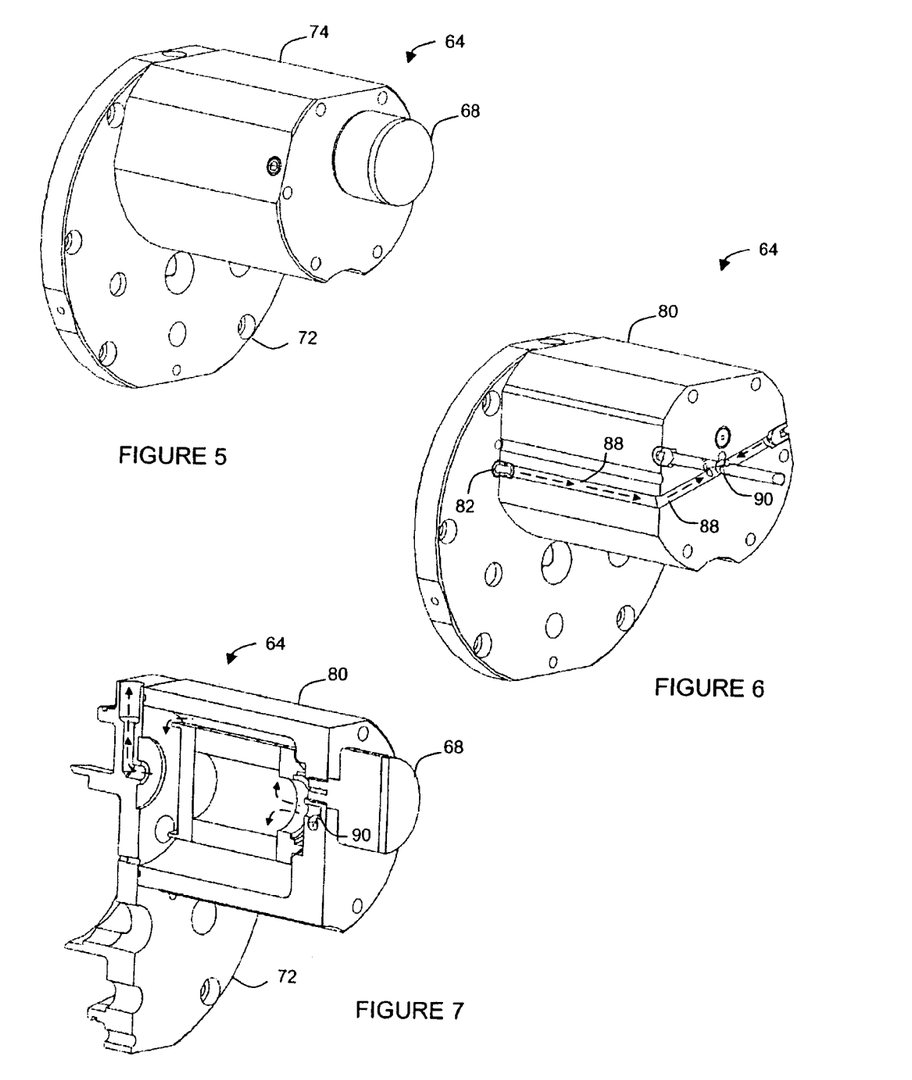
FIG. 5 is a view of the oil separator in isolation from the rest of the compressor according to an embodiment.
FIG. 6 shows the oil separator without its housing according to an embodiment.
FIG. 7 is a cutaway view of the oil separator depicting its internal structure according to an embodiment.

Because of the exposed location, the oil separator is cold relative to the air arriving from the compressor unit. The sudden temperature reduction causes the water vapor within the air to condense as it flows into the oil separator. This is problematic because the accumulation of water within the chamber interferes with the process of removing oil from the compressed air e.g. by adversely affecting the efficacy of the oil filters. Furthermore, introduction of water into the compressor system will, over time, dilute the oil and eventually damage the compressor or at least severely compromise its operation. In conventional compressors, the oil separator is located in a relatively secluded area within the assembly, so that it is protected from the immediate environment and can also be warmed by the operation of other components within the assembly. As a result, condensation levels within oil separators of conventional compressor are lower. The higher condensation levels in compressors of embodiments arises at least in part due to its compact design of the emphasis on reduction of size and weight results in or requires the relatively exposed location of the separator, so that the separation chamber is relatively colder than the arriving air, compared to conventional compressor arrangements.

Referring to FIG. 5, this is a view of the oil separator unit with its housing (74) on, being connected to the compressor via a plate (72) on one end, and to a pressure gauge (68) on the other. As can be seen, the oil separator is substantially cylindrical in shape, the chamber (80) within being formed in part by the plate on one end of the cylinder, and the housing on all other sides.

FIGS. 6 and 7 show in detail how the oil separator is configured to deal with the specific problem of excessive condensation. FIG. 6 is a view of an oil separator within its housing removed to show the underlying oil separator chamber (80) according to an embodiment. Channels or grooves (88) are provided on the surface of the chamber. In the embodiment shown in the figures, these take the form of a one or more channels which run the length of the cylinder as shown and radially to a central aperture or bore extending through the cylindrical chamber and into a central cavity. With its housing (74) in place, the channels cooperate with the inner wall of the housing to form bores or vents suitable for the passage of an air flow therethrough.

In use, compressed air from the compressor unit is directed through these vents. The direction of air movement through these channels/vents along the surface of the chamber is depicted in FIG. 6 by the arrows, showing a flow from an aperture (82) leading to and from the compressor unit, along the channel (88) along the length or height of the cylinder, around the corner and radially towards the aperture (90) leading into the oil separation chamber. In other words, the bore or vent is configured to run parallel to the surface of the separator chamber surface.

FIG. 7 is a cutaway or cross sectional view of the oil separator (64), showing the interior of the chamber along its longitudinal axis. As it can be seen, the aperture (90) leads into a central hollow or cavity within which the oil is separated out from the compressed air using conventional methods. The air flows into the chamber via the aperture (90), then along, within, and eventually out of the chamber as shown by the arrows.

The particular air flow path formed from the internal configuration of the oil separator is directed to reducing excessive condensation caused by its location. As noted earlier, the exposed position of the oil separator is derived from parallel arrangement of compressor and motor, which in turn is driven by the aim of reducing the overall size and weight of the compressor while maintaining a powerful output.

In use, heated air arriving from the compression chamber which is laden with both oil and water vapor is cooled by being driven along the vents or channels near to the surface of the oil separation unit, which is typically the coolest part of the entire component. This effect is augmented by the path described by the vents, which, in an embodiment, runs near and substantially parallel to the surface of the housing.

Directing the compressed air along this path helps not only to reduce the amount of water that would otherwise have been released into the separation chamber, but it further helps to lower the temperature of the heated air and oil, and as a result will improve the efficiency of the oil separator creating less oil carry over.

The skilled person can appreciate that a number of variations exist to the embodiments shown in the figures. For example, the function of the channels or bores (88) on the surface of the oil separation chamber can be performed by a wholly or partially annular space between the separator housing and a concentric wall which serves as the air vent. The housing can be removable or fixed to the chamber. In the latter case, there can be no separate housing as such, but a unitary chamber into the wall of which the vents configured for air flow are drilled or otherwise provided, and the bores or vents can run substantially parallel or alongside the externally-facing surface of the oil separation chamber.

The embodiments described above and in the drawings are for ease of description only and not meant to restrict the apparatus or methods to a particular arrangement or process in use. As noted above, the methods and apparatus described are merely exemplary and can be usefully deployed in any compressor for a variety of fluids. In the same vein, the invention is not restricted to deployment in the blown fiber field, but is capable of application in any suitable area of industry or otherwise. It will also be apparent to the skilled person that various sequences and permutations on the methods and apparatus described are possible within the scope of this invention as disclosed.

The invention claimed is:

1. An air compressor for compressing atmospheric air to provide compressed air suitable for installing optical fiber units and cable using a blown fiber method, the compressor including an oil separator connected to a supply of compressed air, the oil separator comprising:
   a chamber having a wall defining a cavity within the chamber, the wall having an externally-facing surface; and
   a vent comprising a channel within the wall, or on the externally-facing surface of the wall, and extending between, at a first end, a first aperture and, at a second end, a second aperture through the wall to the cavity, such that in operation heated, compressed air laden with both oil and water vapor enters the vent via the first aperture, is cooled by being driven in a first direction along the channel, and exits the vent into the cavity via the second aperture in a second direction opposite the first direction.

2. A compressor according to claim 1 wherein if the channel is on the externally-facing surface, the wall is configured to cooperate with an internally-facing surface of an oil separator housing to form the vent.

3. A compressor according to claim 1 further comprising:
   a compressor housing;
   a moveable element within the compressor housing which in use compresses air by reducing space available to the air; and
   a motor which during operation moves the movable element, being coupled in a parallel arrangement to the moveable element via a gearing allowing for the moveable element to move at a speed different from a motor operation speed.

4. A compressor according to claim 3 wherein the moveable element moves at a speed slower than the motor operation speed.

5. A compressor according to claim 3 wherein the moveable element comprises blades in a rotary vane arrangement, and wherein the motor is arranged to rotate the blades during operation.

6. A compressor according to claim 3 wherein the gearing comprises an arrangement including a belt and pulleys.

7. A compressor according to claim 3 wherein the compressed air is pressurized to 10 bar.

8. A compressor according to claim 3 wherein the air is further processed to obtain a smooth, pulse-free supply of air which is substantially free of at least one of excessive moisture, excessive dryness, excessive warmth, or excessive oil.

9. A compressor according to claim 1, wherein the compressor is configured to blow an optical fiber into a tube.

10. A system for installing an optical fiber into a tube using pressurized air supplied by an air compressor for compressing atmospheric air, the compressor comprising an oil separator connected to a supply of compressed air, the oil separator comprising:
    a chamber having a wall defining a cavity within the chamber, the wall having an externally-facing surface; and
    a vent comprising a channel within the wall, or on the externally-facing surface of the wall, and extending between, at a first end, a first aperture and, at a second end, a second aperture through the wall to the cavity, such that in operation heated, compressed air laden with both oil and water vapor enters the vent via the first aperture, is cooled by being driven in a first direction along the channel, and exits the vent into the cavity via the second aperture in a second direction opposite the first direction.

11. A method for installing an optical fiber into a tube by using pressurized air supplied by a compressor, the method comprising:

blowing the optical fiber into the tube using the compressor, the compressor comprising an oil separator connected to a supply of compressed air, the oil separator comprising: a chamber having a wall defining a cavity within the chamber, the wall having an externally-facing surface, a vent comprising a channel within the wall, or on the externally-facing surface of the wall, and extending between, at a first end, a first aperture and, at a second end, a second aperture through the wall to the cavity, such that heated, compressed air laden with both oil and water vapor enters the vent via the first aperture, is cooled by being driven in a first direction along the channel, and exits the vent into the cavity via the second aperture in a second direction opposite the first direction.

* * * * *